(12) United States Patent
Vaclavek et al.

(10) Patent No.: US 12,729,831 B2
(45) Date of Patent: Sep. 8, 2026

(54) PROGRESSIVE FROST IN A LUMINAIRE

(71) Applicant: ROBE lighting s.r.o., Roznov pod Radhostem (CZ)

(72) Inventors: Marek Vaclavek, Valasske Mezirici (CZ); Petr Nemec, Krhova (CZ); Jan Vilem, Valasske Mezirici (CZ); Josef Valchar, Prostredni Becva (CZ)

(73) Assignee: ROBE lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 19/317,939

(22) Filed: Sep. 3, 2025

(65) Prior Publication Data

US 2026/0002655 A1 Jan. 1, 2026

(51) Int. Cl.
*F21V 3/04* (2018.01)
*F21S 10/00* (2006.01)
(Continued)

(52) U.S. Cl.
CPC .............. *F21V 3/049* (2013.01); *F21V 5/004* (2013.01); *F21S 10/007* (2013.01); *F21V 3/0615* (2018.02);
(Continued)

(58) Field of Classification Search
CPC ........ G02B 5/02; G02B 5/0205; G02B 5/021; G02B 5/0215; G02B 5/0221;
(Continued)

(56) References Cited

U.S. PATENT DOCUMENTS 4,316,241 A * 2/1982 Gulliksen ............... F21V 14/06 362/325
5,515,254 A 5/1996 Smith et al.
(Continued)

FOREIGN PATENT DOCUMENTS

CN 112879827 A * 6/2021 ................ F21V 5/00
CN 220417079 U 1/2024
(Continued)

OTHER PUBLICATIONS

Machine translation of CN 112879827 A retrieved from the FIT database of PE2E search. (Year: 2025).*
(Continued)

*Primary Examiner* — Colin J Cattanach
(74) *Attorney, Agent, or Firm* — Conley Rose, P.C.; Brooks W Taylor; Matthew Gibson

(57) ABSTRACT

A luminaire includes a light source configured to generate an emitted light beam and a diffusion wheel subsystem. The subsystem includes a first diffusion wheel to provide different degrees of diffusion to the light beam, and a second diffusion wheel stacked with the first diffusion wheel and to provide different degrees of diffusion to the light beam. A first diffusion region of the first diffusion wheel provides a lowest degree of diffusion, and the first diffusion region of the first diffusion wheel is located at a first edge of the first diffusion wheel. A first diffusion region of the second diffusion wheel provides a degree of diffusion approximately equal to that of the first diffusion region of the first diffusion wheel, and is located at a second edge of the second diffusion wheel.

17 Claims, 10 Drawing Sheets

(51) Int. Cl.

| | |
|---|---|
| ***F21V 3/06*** | (2018.01) |
| ***F21V 5/00*** | (2018.01) |
| ***F21V 5/02*** | (2006.01) |
| ***F21V 5/08*** | (2006.01) |
| ***F21V 14/06*** | (2006.01) |
| ***F21V 14/08*** | (2006.01) |
| ***F21W 131/406*** | (2006.01) |
| ***G02B 5/02*** | (2006.01) |

(52) U.S. Cl.
CPC ............. *F21V 3/0625* (2018.02); *F21V 5/002* (2013.01); *F21V 5/003* (2013.01); *F21V 5/005* (2013.01); *F21V 5/008* (2013.01); *F21V 5/02* (2013.01); *F21V 5/08* (2013.01); *F21V 14/06* (2013.01); *F21V 14/065* (2013.01); *F21V 14/08* (2013.01); *F21V 14/085* (2013.01); *F21W 2131/406* (2013.01); *G02B 5/02* (2013.01); *G02B 5/0205* (2013.01); *G02B 5/021* (2013.01); *G02B 5/0215* (2013.01); *G02B 5/0221* (2013.01); *G02B 5/0226* (2013.01); *G02B 5/0231* (2013.01); *G02B 5/0236* (2013.01); *G02B 5/0242* (2013.01); *G02B 5/0247* (2013.01); *G02B 5/0252* (2013.01); *G02B 5/0257* (2013.01); *G02B 5/0263* (2013.01); *G02B 5/0268* (2013.01); *G02B 5/0273* (2013.01); *G02B 5/0278* (2013.01)

(58) Field of Classification Search
CPC .. G02B 5/0226; G02B 5/0231; G02B 5/0236; G02B 5/0242; G02B 5/0247; G02B 5/0252; G02B 5/0257; G02B 5/0263; G02B 5/0268; G02B 5/0273; G02B 5/0278; F21V 14/06; F21V 14/065; F21V 14/08; F21V 5/002; F21V 5/008; F21V 3/049; F21V 3/0615; F21V 5/003; F21V 5/004; F21V 5/005; F21V 5/02; F21V 5/08
See application file for complete search history.

(56) References Cited

U.S. PATENT DOCUMENTS

| | | | | |
|---|---|---|---|---|
| 6,580,560 | B1 * | 6/2003 | Benner, Jr. ........... | H04N 9/3129 348/E9.026 |
| 10,197,244 | B2 * | 2/2019 | Quadri .................... | F21V 13/14 |
| 10,386,030 | B2 * | 8/2019 | Campetella ............... | F21V 9/40 |
| 12,460,793 | B2 * | 11/2025 | Kessler ................. | F21S 10/007 |
| 2011/0103074 | A1 | 5/2011 | Jurik | |
| 2013/0294080 | A1 * | 11/2013 | Hansen ................... | F21V 11/18 362/271 |
| 2017/0090115 | A1 * | 3/2017 | Jurik ..................... | F21V 14/006 |
| 2020/0236759 | A1 * | 7/2020 | Jurik ......................... | F21K 9/20 |
| 2024/0295306 | A1 | 9/2024 | Kessler et al. | |

FOREIGN PATENT DOCUMENTS

| | | | | |
|---|---|---|---|---|
| GB | 2516039 | A * | 1/2015 | ............ F21S 10/007 |
| WO | WO-2014031644 | A1 * | 2/2014 | .............. F21V 14/08 |
| WO | 2020048104 | A1 | 3/2020 | |

OTHER PUBLICATIONS

European Extended Search Report; Application No. 25227503.7; Jun. 17, 2026; 9 pages.

* cited by examiner

PROGRESSIVE FROST IN A LUMINAIRE

CROSS-REFERENCE TO RELATED APPLICATIONS

Not applicable.

TECHNICAL FIELD OF THE DISCLOSURE

The disclosure generally relates to luminaires, and more specifically to a diffusion wheel system to implement progressive frost in a luminaire.

BACKGROUND

Some luminaires in the entertainment and architectural lighting markets include automated and remotely controllable functions. Such luminaires may be used in theatres, television studios, concerts, theme parks, night clubs, and other venues. A luminaire may provide control over the pan and tilt functions of the luminaire allowing an operator to control a direction that the luminaire is pointing and thus a position of the luminaire's light beam on a stage or in a studio. Such position control may be obtained via control of the luminaire's position in two orthogonal rotational axes, which may be referred to as pan and tilt. Some luminaires provide control over other parameters such as intensity, color, focus, beam size, beam shape, and/or beam pattern. Where such luminaires are remotely controllable, they may be referred to as automated luminaires.

The optical systems of such automated luminaires may be designed to enable a user to control the beam size, from a very narrow output beam to a wider, wash beam. Such control may allow such luminaires to be used with long throws to a target or for almost parallel light effects as well as for wider, more traditional wash effects. Optical systems with the ability to produce narrow beams may be referred to as 'Beam' optics, while optical systems with the ability to produce wide beams may be referred to as 'Wash' optics.

Regardless of beam size, the optical systems of such automated luminaires may also be designed to enable a user to add a frosted effect to the beam. For example, a diffuser or frosted material (e.g., frosted glass or acrylic) is placed in the beam to produce a more diffused beam effect having visually softer beam edges.

SUMMARY

In a first embodiment, a luminaire includes a light source configured to generate an emitted light beam; and a diffusion wheel subsystem, including a first diffusion wheel and a second diffusion wheel stacked with the first diffusion wheel. The first diffusion wheel is configured to provide different degrees of diffusion to a light beam passing therethrough, where a first diffusion region of the first diffusion wheel provides a lowest degree of diffusion, and where the first diffusion region of the first diffusion wheel is located at a first edge of the first diffusion wheel. The second diffusion wheel is configured to provide different degrees of diffusion to a light beam passing therethrough, where a first diffusion region of the second diffusion wheel provides a degree of diffusion approximately equal to that of the first diffusion region of the first diffusion wheel, where the first diffusion region of the second diffusion wheel is located at a second edge of the second diffusion wheel, and where the second edge of the second diffusion wheel is an opposite edge relative to the first edge of the first diffusion wheel. The diffusion wheel subsystem is configured to be in a retracted configuration in which the first and second diffusion wheels are positioned out of the emitted light beam. The diffusion wheel subsystem is configured to be in an initial configuration in which the first diffusion region of the first diffusion wheel is radially adjacent in the emitted light beam to the first diffusion region of the second diffusion wheel, and in which at least one of the first diffusion regions of the first and second diffusion wheels is positioned in the emitted light beam. The first diffusion wheel and the second diffusion wheel are configured to rotate in opposite directions to transition from the retracted configuration to the initial configuration. The diffusion wheel subsystem is also configured to be in a rotated configuration relative to the initial configuration in which one or more of the diffusion regions of the first diffusion wheel or of the second diffusion wheel are in the emitted light beam. The first diffusion wheel and the second diffusion wheel are configured to rotate in a same direction to transition from the initial configuration to the rotated configuration.

In a second embodiment, a method of controlling a luminaire includes receiving, by a control system of the luminaire via a data link, a command indicating a commanded frost level for an emitted light beam of the luminaire; and transitioning, responsive to the command, a diffusion wheel subsystem of the luminaire in sequence from a retracted configuration to an initial configuration, and from the initial configuration to a rotated configuration. The diffusion wheel subsystem includes a first diffusion wheel and a second diffusion wheel. The first diffusion wheel is configured to provide different degrees of diffusion to a light beam passing therethrough, where a first diffusion region of the first diffusion wheel provides a lowest degree of diffusion. The second diffusion wheel is configured to provide different degrees of diffusion to a light beam passing therethrough, where a first diffusion region of the second diffusion wheel provides a degree of diffusion approximately equal to that of the first diffusion region of the first diffusion wheel. In the retracted configuration, the first and second diffusion wheels are positioned out of the emitted light beam. Transitioning the diffusion wheel subsystem from the retracted configuration to the initial configuration includes rotating the first diffusion wheel and the second diffusion wheel in opposite directions until the first diffusion region of the first diffusion wheel is radially adjacent in the emitted light beam to the first diffusion region of the second diffusion wheel. Transitioning the diffusion wheel subsystem from the initial configuration to the rotated configuration includes rotating the first diffusion wheel and the second diffusion wheel in a same direction until a diffusion region corresponding to the commanded frost level is in the emitted light beam.

In a third embodiment, a luminaire includes a light source configured to generate an emitted light beam, and a diffusion wheel that includes at least one progressive diffusion region that provides a progressive range of diffusion to a light beam passing therethrough. An area of the diffusion wheel that provides a lowest degree of diffusion is located at an edge of the diffusion wheel. In a retracted position, the diffusion wheel is positioned out of the emitted light beam, and in an initial position, the area that provides the lowest degree of diffusion is positioned in the emitted light beam. The diffusion wheel is configured to rotate from the initial position to provide a progressively-increasing amount of diffusion to the emitted light beam.

BRIEF DESCRIPTION OF THE DRAWINGS

For a more complete understanding of this disclosure, reference is now made to the following brief description, taken in conjunction with the accompanying drawings in which like reference numerals indicate like features.

DETAILED DESCRIPTION

Figure 1:
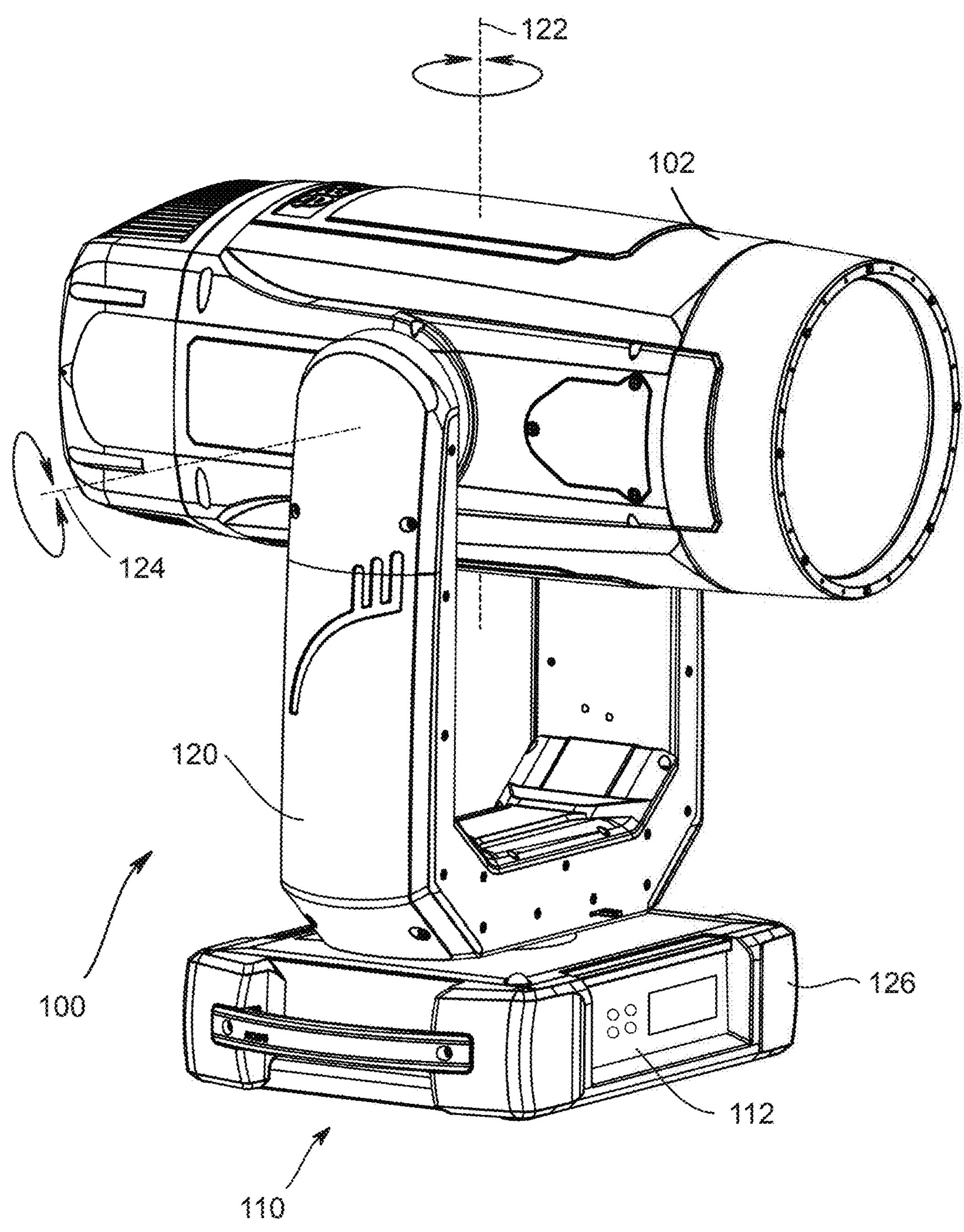
FIG. 1 presents an isometric view of a luminaire according to the disclosure.

Preferred embodiments are illustrated in the figures, like numerals being used to refer to like and corresponding parts of the various drawings.

Some luminaires (both automated and non-automated) comprise a light source including a discharge lamp or a light emitting diode (LED) array, or laser-based light source, where a laser LED is used as a pump for a light emitting phosphor.

Luminaires according to the disclosure may comprise a variety of optical systems: a fixed "beam" optical system that produces a hard-edge beam, a fixed "wash" optical system that produces a wide beam of a fixed beam angle, or a zoom optical system that can change the beam diameter from a narrow beam to a wide beam. Such optical systems may also have the ability to produce a beam with a frosted effect from a diffuser or frosted material inserted into the optical train.

It may be useful to reduce tradeoffs associated with luminaires that are configured to produce a beam with or without a frosted effect. For example, a luminaire may achieve the frosted effect by positioning a frost flag (e.g., an optical element configured to produce a frosted effect) in the beam path. In some cases, the frost flag may be a hard diffusion foil having a thickness of approximately 0.1 millimeter (mm) to 0.5 mm. In other cases, the frost flag may be glass. Regardless of the material type, different frost flags may be configured to implement different amounts of the frosted or diffused beam effect. For example, a 1° frost flag may provide smooth diffusion around the beam edges (or around the edges of framing shutters, such as to remove sharp edges and/or blend edges of shutters that are on different focal planes). A 5° frost flag may provide a wash beam similar to a beam output from a Fresnel lens or a plano-convex lens, and which reduces light output by more than the 1° frost flag, although not by as much as a frost flag of a greater degree. A 10° frost flag provides an even more diffused beam, similar to a wash beam with a wide spread. The 10° frost flag also reduces light output by more than the 5° frost flag. As used herein, references to a degree of frost are intended to demonstrate the relative frost or diffusion added to a light beam by a particular diffusion region, but are not necessarily meant to refer to absolute or measured values of such frost or diffusion. For example, 1° of frost may be characterized as a "light" frost, 5° may be a "medium" frost, and 10° may be a "heavy frost." Degrees of frost between these values are meant to reflect the progressive nature of frost effects that are enabled by the embodiments described herein (e.g., 2° is greater than 1°, 3° is greater than 2°, and so on).

Regardless of the number and/or degree of frost flags in the luminaire, each frost flag may be controlled by its own associated motor and can thus be inserted into and removed from the beam path independently of the other frost flag(s). In some cases, multiple frost flags may be inserted into the beam path to provide additional diffusion. However, positioning multiple frost flags in the light beam may result in an unacceptably high reduction in light output (e.g., more reduction than desired by a user of the luminaire).

In such luminaires, the frost flag is moved into the beam path from one side. Although the frost flag may be inserted into the beam path relatively quickly (e.g., in less than 0.25 seconds), the insertion of the frost beam into the beam path still results in a perceivable visual artifact, where a viewer may notice that the diffusion is occurring on one edge of the beam earlier than on another (e.g., opposite) edge of the beam. This visual artifact is more noticeable with increasing degrees of frost.

Other luminaires may address the perceivable visual artifact described above by using two frost flags having a same degree of diffusion, in which each frost flag is inserted into the beam path from a different (e.g., opposing) side. However, such a mechanism may be more costly (e.g., due to additional motors and/or gear systems to operate the additional frost flag and produce only a single degree of diffusion) and consume more space in the luminaire body to implement.

In both of the foregoing approaches to providing a frosted effect for a luminaire, the beam is only diffused to the degree of the frost flag that is placed in the beam path, and progressively-increasing or progressively-decreasing diffusion levels are not easily achieved. For example, if a luminaire includes a 1° frost flag, a 5° frost flag, and a 10° frost flag, and it is desired to transition from a hard-edge beam (i.e., with no frost flag in the beam path) to 5° or 10° frost, the appropriate frost flag is inserted into the beam path and the visual effect is a direct transition from the hard-edge beam to 5° frost or 10° frost, respectively. However, it may be more visually pleasing for a viewer to observe progressively-increasing diffusion levels from the hard-edge beam from no diffusion to 5° frost, 10° frost, and the like. Correspondingly, it may be more visually pleasing for a viewer to observe progressively-decreasing diffusion levels from 5° frost, 10° frost, and the like, to the hard-edge beam.

Embodiments of this disclosure address the foregoing by providing a luminaire with a diffusion wheel subsystem that includes a first diffusion wheel and a second diffusion wheel. The first diffusion wheel includes a plurality of diffusion regions that provide different degrees of diffusion to a light beam of the luminaire. The first diffusion wheel may instead include one or more progressive diffusion regions that each provide different (e.g., increasing or decreasing, depending on direction of rotation) degrees of diffusion. For example, a single progressive diffusion region of the first diffusion wheel may provide a progressive range from 0° to 5° (or other ranges) of diffusion without discrete diffusion regions. A first diffusion region of the first diffusion wheel provides a lowest degree of diffusion for the first diffusion wheel. The second diffusion wheel also includes at least a first diffusion region that provides a degree of diffusion approximately equal to that of the first diffusion region of the first diffusion wheel. The second diffusion wheel may instead include only a single diffusion region that provides a degree of diffusion approximately equal to that of the first diffusion region of the first diffusion wheel. The second diffusion wheel may also include one or more progressive diffusion regions (in addition to the first diffusion region) that each provide different (e.g., increasing or decreasing, depending on direction of rotation) degrees of diffusion.

When the diffusion wheel subsystem is in a retracted configuration, the first and second diffusion wheels are positioned out of the light beam. Then, when the diffusion wheel subsystem transitions from the retracted configuration to an initial configuration, the first diffusion region of each of the diffusion wheels is inserted into the light beam from different (e.g., opposing) sides, at approximately the same time. As explained above, this may alleviate or reduce perceivable visual artifacts that occur when a frost flag is inserted from only one side of the light beam.

Subsequently, when the diffusion wheel subsystem transitions from the initial configuration to a rotated configuration, the first and second diffusion wheels rotate to move the diffusion regions of the first diffusion wheel (and, in some cases, diffusion regions of the second diffusion wheel) through the light beam in a progressively-increasing manner. As explained above, it may be more visually pleasing for a viewer to observe progressively-increasing diffusion levels from the hard-edge beam to a particular level of frost, rather than observing a jump from the hard-edge beam to the particular level of frost directly. These and other examples are described more fully below, with reference made to the accompanying figures.

FIG. 1 presents an isometric view of a luminaire 100 according to the disclosure. The luminaire 100 is a luminaire comprising a head 102 which is configured to rotate within a yoke 120 about a tilt axis 124. The yoke 120 is configured to rotate relative to a fixed enclosure 126 (e.g., or a base 126) about a pan axis 122. The pan axis 122 and the tilt axis 124 are orthogonal to each other. Both pan and tilt motions may be mechanically coupled to hand-operated manual controls or may be coupled for motion to motors, linear actuators, or other electromechanically controlled mechanisms. Such electromechanical mechanisms may be under the control of a control system 110 (e.g., a microcontroller or other programmable processing system) included in the luminaire 100. In some embodiments, the control system 110 may be controlled locally via a user interface 112 included in the luminaire 100. In other embodiments, the control system 110 may be in wired or wireless communication via a data link with a remotely located control console that an operator uses to indicate a desired position of the head 102. In such embodiments, the operator is able to direct light output from the luminaire 100 in a desired direction, through motion of the head 102 in the pan axis 122 and tilt axis 124.

As explained above, the luminaire 100 includes a control system (or controller) 110 of the luminaire 100. The control system 110 is configured to control a motion of the various electromechanical mechanisms of the luminaire 100. In various embodiments, the control system 110 comprises a microcontroller or other programmable processing system. In some embodiments, the control system 110 may be coupled for local control to a user interface 112 included in the luminaire 100 and configured to receive therefrom signals relating to desired positions of the electromechanical mechanisms.

In other embodiments, the control system 110 may be coupled for remote control by the data link (e.g., a wired or wireless data link) to a remotely located control console and to receive signals therefrom (e.g., commands) indicating various electrical or electromechanical control operations to be carried out by the luminaire 100. The data link may use DMX512 (Digital Multiplex) protocol or other suitable communication protocol, e.g., Art-Net, Architecture for Control Networks (ACN), and Streaming ACN.

Figure 2:
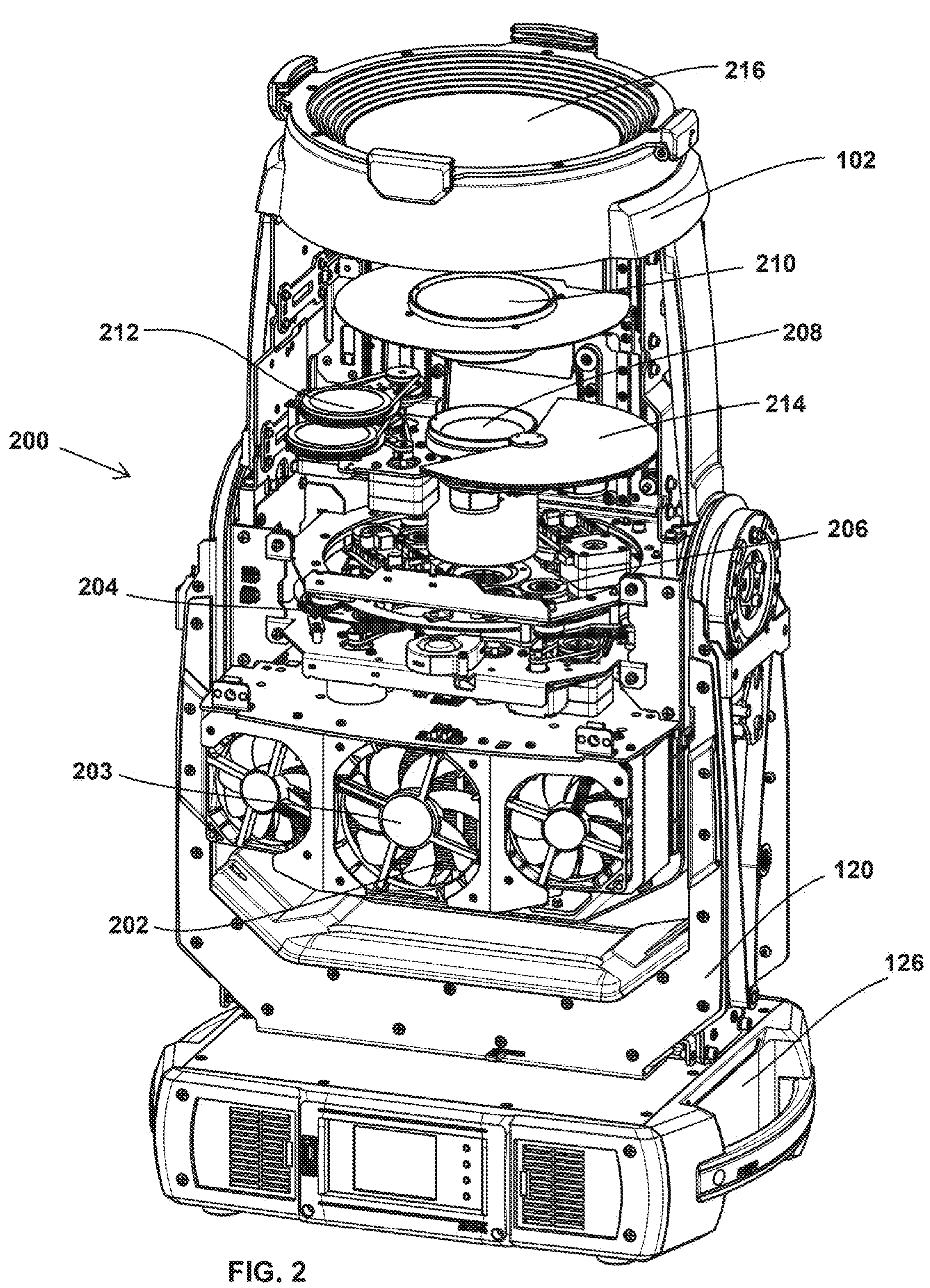
FIG. 2 presents an isometric view of the luminaire of FIG. 1 with a head cover removed, revealing the internal optical system.

FIG. 2 presents an isometric view of the luminaire 100 of FIG. 1 with a head cover removed, revealing an internal optical system 200 according to the disclosure. The internal optical system 200 comprises various optical subsystems including, but not limited to, the optical subsystems described herein. A light beam is produced by a light source 202, which may be a discharge lamp, a light emitting diode (LED) array, a laser based light source, or other light source. The light source 202 may include one or more heatsinks coupled thereto, to facilitate cooling of the light source 202. Cooling fans 203 may be positioned proximate to the light source 202 (and the heatsinks thereof) to provide active airflow around the light source 202 to further facilitate cooling of the light source 202.

The light beam is directed through a color filter subsystem 204 (which may comprise color wheels or subtractive color mixing systems) before passing into an imaging subsystem 206 comprising one or more gobo wheels and a beam size iris. The imaging subsystem 206 in some embodiments may also include a framing shutter subsystem. After passing through the imaging subsystem 206, the light beam passes through lens subsystems 208, 210, and 216. The lens subsystem 208 comprises a focus lens, which is movable to adjust the focus of the light beam produced by the luminaire 100. The lens subsystem 210 comprises a zoom lens, which is movable to adjust the beam angle of the light beam (and thus the size of the projected image) produced by the luminaire 100. The lens subsystem (or output lens) 216 is a fixed subsystem.

The internal optical system 200 also includes beam modifiers, such as prisms 212 and diffusion wheels 214, which may be moved into and out of the path of the light beam. The diffusion wheels 214 provide different degrees of frost, and are discussed in further detail below. The light beam is emitted from the luminaire through the output lens 216. The lens subsystems 208, 210, and the output lens 216 provide a variable focal length zoom optical subsystem that is configured to adjust a beam angle of the output light beam from wide to narrow. In some embodiments, such a zoom optical system produces beam angles from 3.5° to 52°.

Moving or otherwise adjusting various components of the internal optical system 200 may be provided through mechanical couplings to hand-operated manual controls or to motors, linear actuators, or other electromechanical mechanisms for motion. Such electromechanical mechanisms are electrically coupled to the control system 110. In such embodiments, the control system 110 is configured to move various components of the internal optical system 200 in response to signals (e.g., commands) received via a data link of the luminaire 100.

Figure 3:
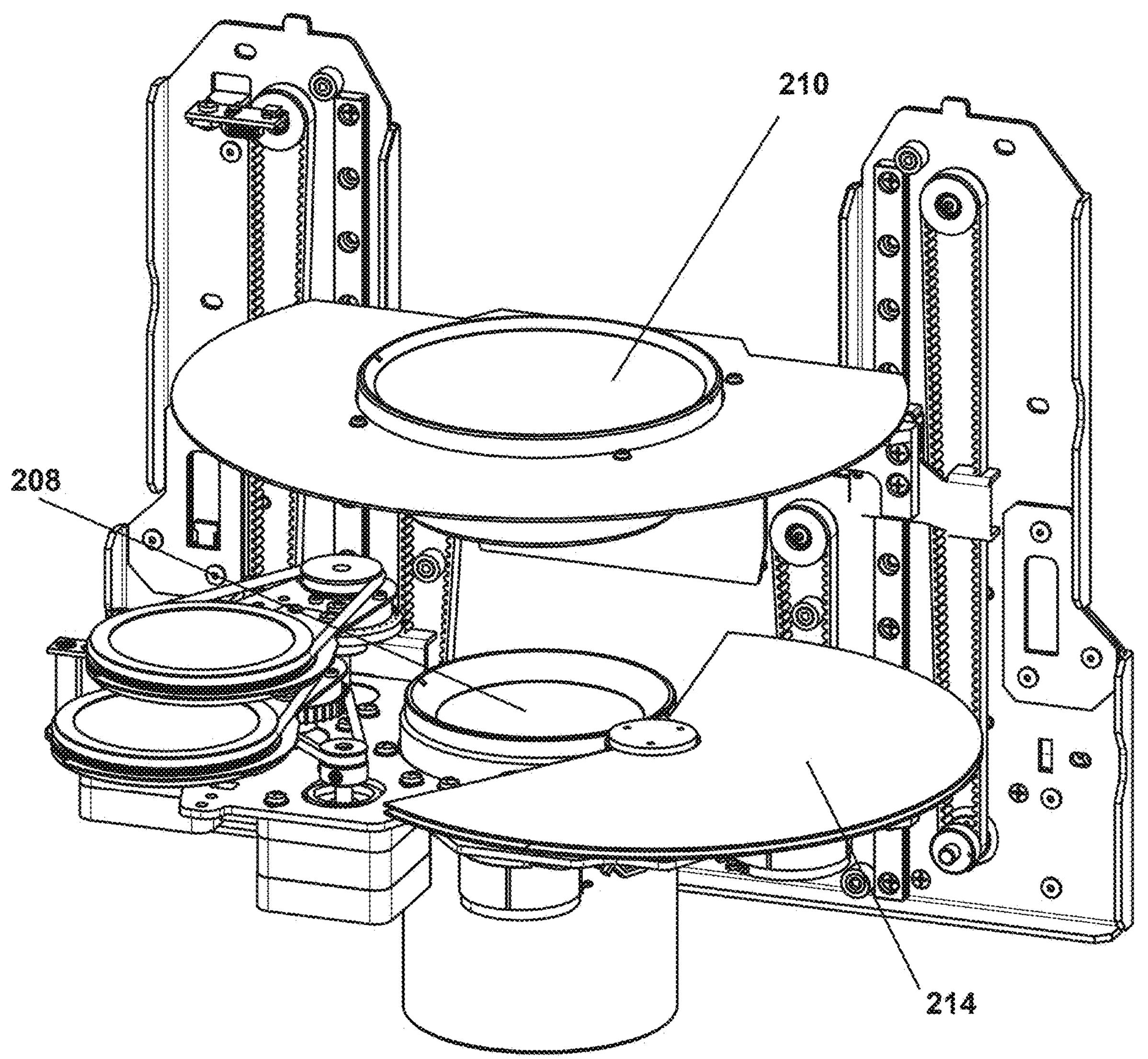
FIG. 3 shows the lens subsystems and the diffusion wheels of FIG. 2 in greater detail and according to the disclosure.

FIG. 3 shows the lens subsystems 208, 210 and the diffusion wheels 214 in greater detail. As described above, both the lens subsystem 208 and the lens subsystem 210 are movable (e.g., fore and aft along the optical axis) to adjust the focus and zoom of the light beam produced by the luminaire 100. As shown, the diffusion wheels 214 are configured to move along with the lens subsystem 208. In other words, the diffusion wheels 214 are in a fixed position relative to the lens subsystem 208 along the optical axis. In an alternate embodiment, the diffusion wheels 214 are configured to move along with the lens subsystem 210. In other words, in this alternate embodiment, the diffusion wheels 214 are in a fixed position relative to the lens subsystem 210 along the optical axis. Accordingly, the diffusion wheels 214 are capable of inserting different degrees of frost at any configuration of zoom or beam angle.

Figure 4:
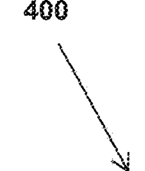
FIG. 4 shows a diffusion wheel subsystem according to the disclosure.
Figure 4:
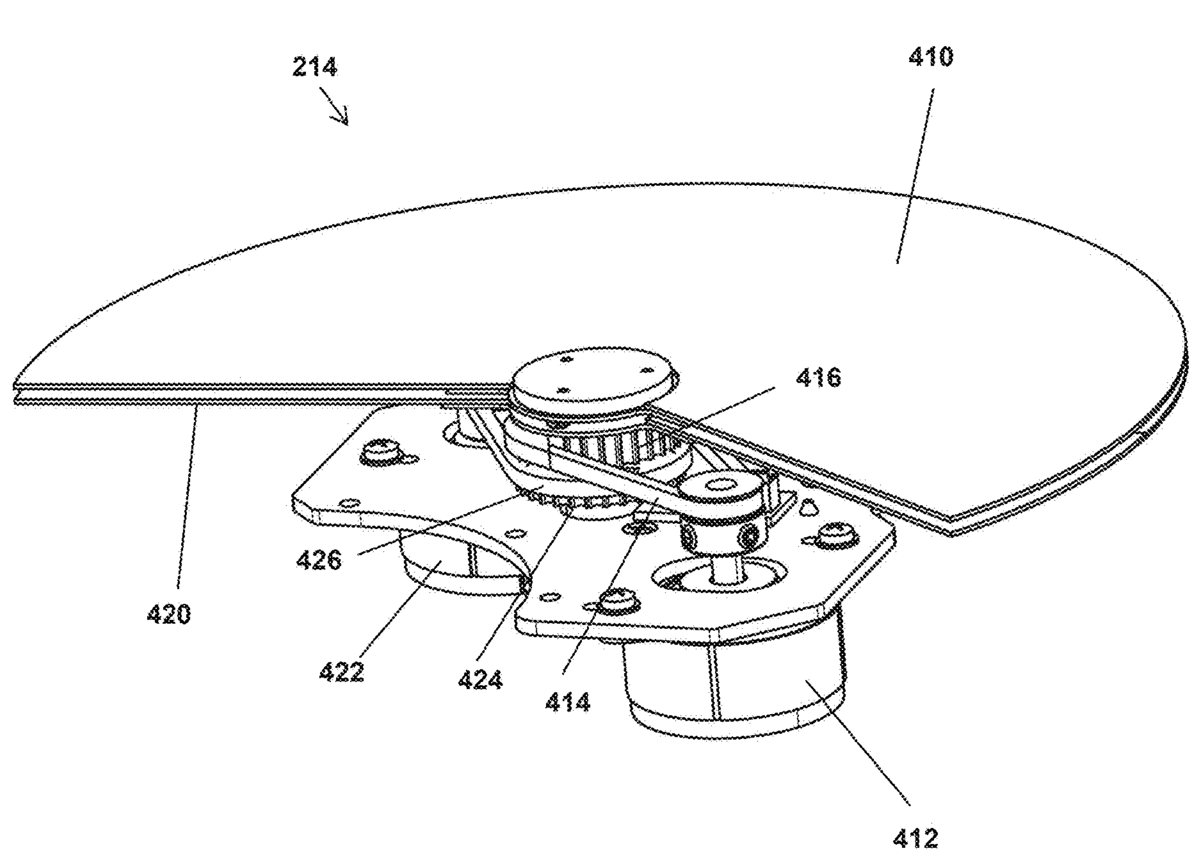

FIG. 4 shows a diffusion wheel subsystem 400 in accordance with the embodiments described herein. The diffusion wheel subsystem 400 includes the diffusion wheels 214, which FIG. 4 shows in greater detail. In FIG. 4, the diffusion wheels 214 include a first diffusion wheel 410 and a second diffusion wheel 420. The first and second diffusion wheels 410, 420 are arranged in a stacked manner. In an embodiment of this disclosure, the first and second diffusion wheels 410, 420 are sectors of a circle. In a particular example, the first and second diffusion wheels 410, 420 are sectors of a circle that are greater in angular dimension than a semicircle (i.e., the first and second diffusion wheels 410, 420 cover an area greater than 180 degrees). Although FIG. 4, depicts the first and second diffusion wheels 410, 420 as being approximately equal in size, in other examples the first and second diffusion wheels 410, 420 may be different in size (e.g., each diffusion wheel 410, 420 has a different angular dimension).

The diffusion wheel subsystem 400 also includes motor(s) and associated gear system(s) to drive the first and second diffusion wheels 410, 420 to rotate to different positions. A first motor 412 is coupled to a first belt 414, which is in turn coupled to a first gear 416 that drives the first diffusion wheel 410. Similarly, a second motor 422 is coupled to a second belt 426, which is in turn coupled to a second gear 424 that drives the second diffusion wheel 420. The control system 110 is configured to control the first motor 412 and the second motor 422 to rotate the first and second diffusion wheels 410, 420 within the light beam.

In other embodiments, different combinations of motors and/or gear systems may be used, and the embodiments described herein are not necessarily limited to the motor drive arrangement shown in FIG. 4. Regardless of the particular motor drive arrangement, the first and second diffusion wheels 410, 420 are configured to operate independently of one another to provide the functionality described herein.

In accordance with various embodiments, the position of the first and second diffusion wheels 410, 420 may be controlled by the control system 110. That is, the control system 110 is configured to generate signals that cause the first and second diffusion wheels 410, 420 to rotate to various positions in response to various scenarios, in response to various conditions being satisfied, and/or in response to various commands being received (e.g., via the data link).

Figure 5:
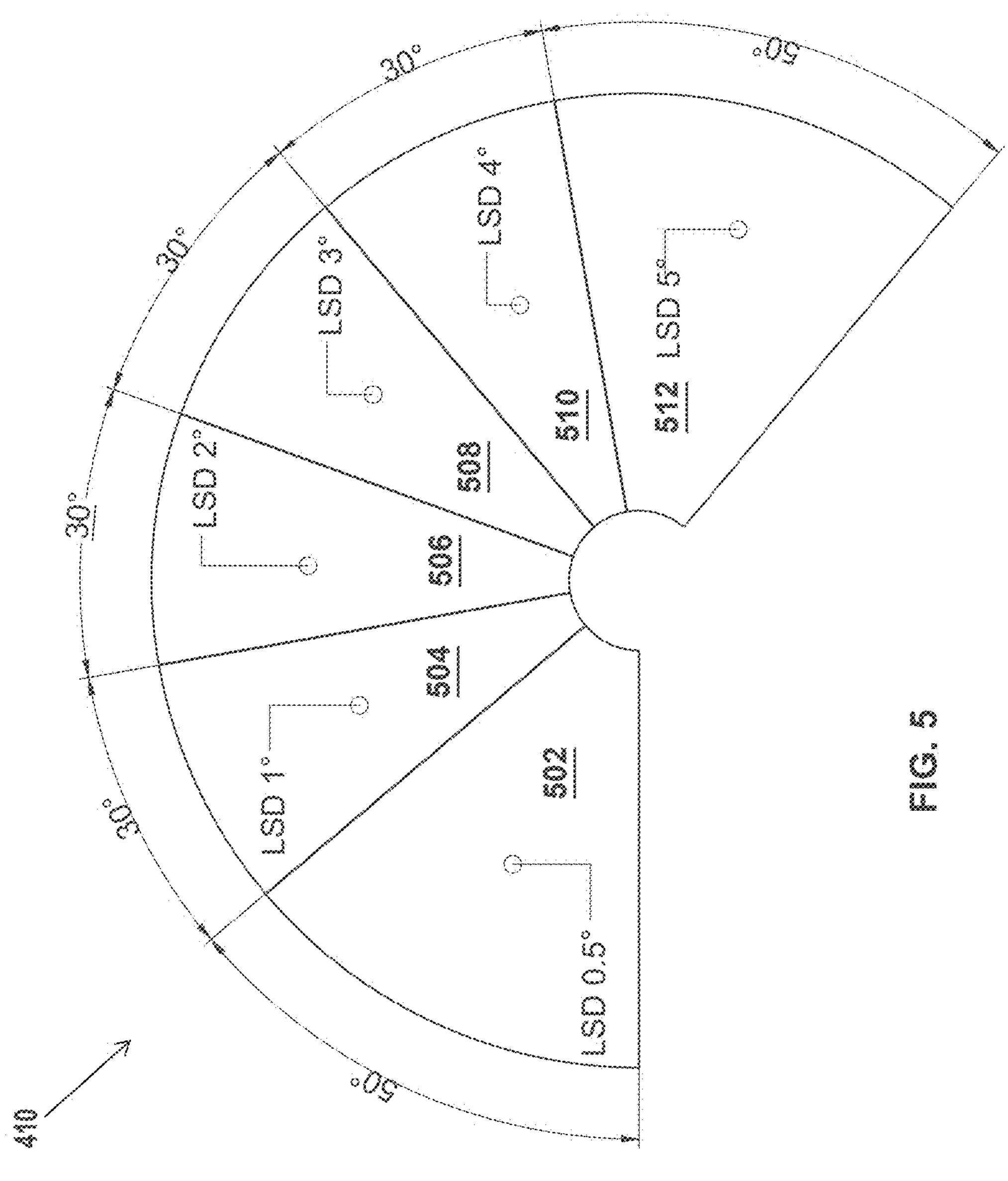
FIG. 5 shows a plan view of a first diffusion wheel according to the disclosure.

FIG. 5 shows a plan view of the first diffusion wheel 410 in accordance with the embodiments described herein. The first diffusion wheel 410 comprises multiple different diffusion regions (e.g., light shaping diffusers (LSDs), with each diffusion region providing a correspondingly different degree of diffusion or frost. For example, a first diffusion region 502 provides 0.5° of frost, a second diffusion region 504 provides 1° of frost, a third diffusion region 506 provides 2° of frost, a fourth diffusion region 508 provides 3° of frost, a fifth diffusion region 510 provides 4° of frost, and a sixth diffusion region 512 provides 5° of frost.

In the first diffusion wheel 410, the diffusion regions 502-512 are arranged in an order of progressively-increasing degrees of diffusion or frost. In other words, the lowest-diffusion region (i.e., the first diffusion region 502) is proximate to a first edge of the first diffusion wheel 410 (i.e., on the left as shown in FIG. 5), while the highest-diffusion region (i.e., the sixth diffusion region 512) is proximate to a second edge of the first diffusion wheel 410 (i.e., on the right as shown in FIG. 5). As used herein, the "edge" of a diffusion wheel refers to a region adjacent to an open part of the diffusion wheel.

As shown in FIG. 5, the first diffusion wheel 410 has an angular dimension of 220°. The first diffusion region 502 and the sixth diffusion region 512 each have angular dimensions of 50°, while the second through fifth diffusion regions 504-510 each have angular dimensions of 30°. In some embodiments, the angular dimension of 50° is sufficient to fully cover the light beam passing through the first diffusion wheel 410. In other words, if the first diffusion region 502 or the sixth diffusion region 512 is positioned in the beam path, the entire light beam produced by the luminaire 100 is subjected to 0.5° of frost or 5° of frost, respectively. Continuing this example, the angular dimension of 30° is insufficient to fully cover the light beam passing through the first diffusion wheel 410. In other words, if any of the second through fifth diffusion regions 504-510 is positioned in the beam path, at least part of the light beam produced by the luminaire 100 is subjected to a diffusion angle different than that of the region positioned most directly in the beam path.

In other examples, the first diffusion wheel 410 may contain more or fewer diffusion regions than shown in FIG. 5. Also, the diffusion regions of the first diffusion wheel 410 may provide different degrees of diffusion than shown in FIG. 5. The angular dimension of the diffusion regions 502-512 of the first diffusion wheel 410 may also differ from those shown in FIG. 5. For example, the diffusion regions 502-512 may all be of the same size (e.g., the same angular dimension), such as all being 30°, all being 50°, or all being a different angle. Further, although depicted as discrete diffusion regions in FIG. 5, in other examples the first diffusion wheel 410 may include one or more progressive diffusion regions that each provide different (e.g., increasing or decreasing, depending on direction of rotation) degrees of diffusion. In one example, only the first diffusion wheel 410 is included in the diffusion wheel subsystem 400, and includes at least one progressive diffusion region that provides the progressive range of diffusion to the light beam passing therethrough. In this example, an area of the first diffusion wheel 410 that provides a lowest degree of diffusion is located at an edge of the first diffusion wheel 410.

Figure 6:
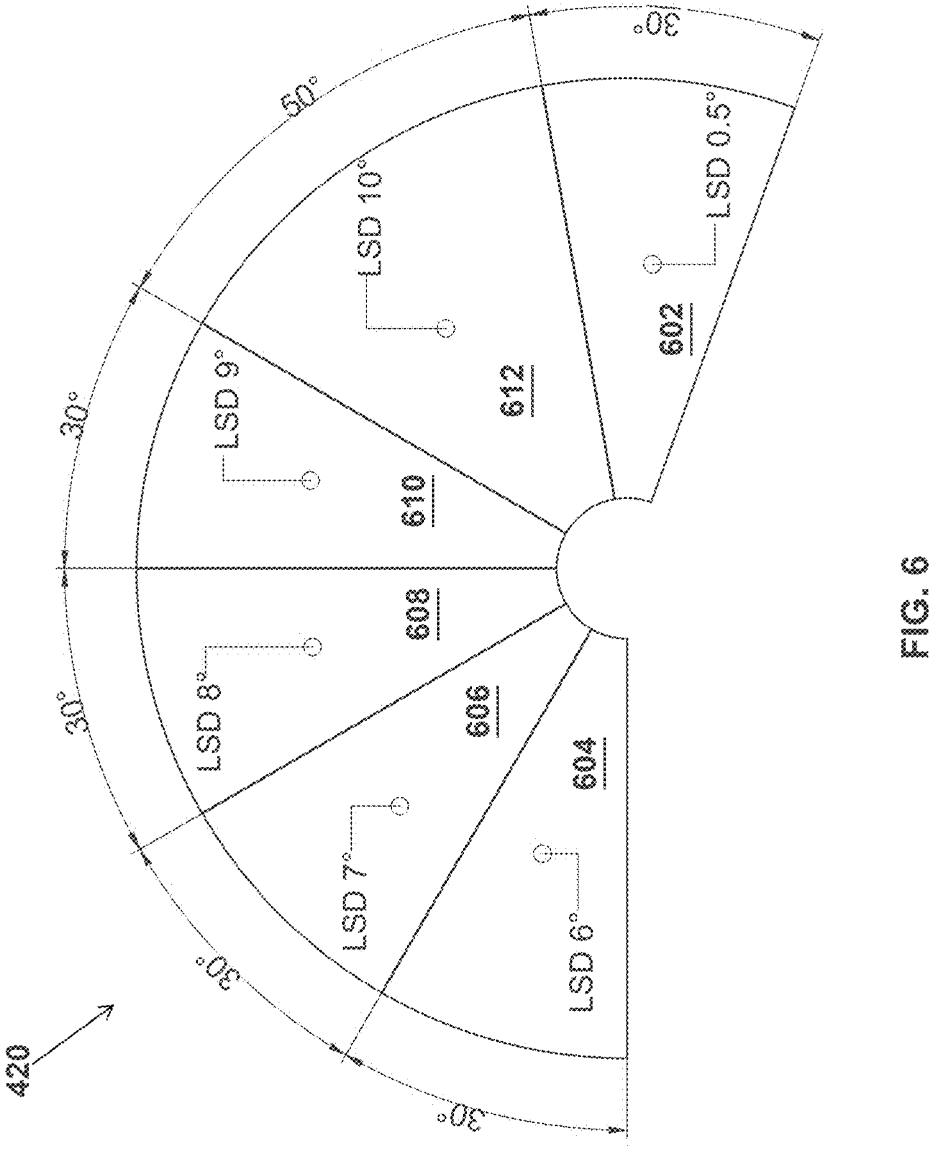
FIG. 6 shows a plan view of a second diffusion wheel according to the disclosure.

FIG. 6 shows a plan view of the second diffusion wheel 420 in accordance with the embodiments described herein. The second diffusion wheel 420 comprises multiple different diffusion regions, with each diffusion region providing a correspondingly different degree of diffusion or frost. In this embodiment, a first diffusion region 602 provides 0.5° of frost, a second diffusion region 604 provides 6° of frost, a third diffusion region 606 provides 7° of frost, a fourth diffusion region 608 provides 8° of frost, a fifth diffusion region 610 provides 9° of frost, and a sixth diffusion region 612 provides 10° of frost. As explained further below, the first diffusion region 602 has a degree of diffusion that is approximately equal (e.g., within +/−10%) to the degree of diffusion of the first diffusion region 502 in the first diffusion wheel 410. Also, the second diffusion region 604 has a degree of diffusion that may provide a progressive increase (e.g., a same or similar step size) from the degree of diffusion of the sixth diffusion region 512 of the first diffusion region wheel 410.

The diffusion regions 602-612 are arranged in a different order in the second diffusion wheel 420 than are the regions 502-512 in the first diffusion wheel 410. In the second diffusion wheel 420, the first diffusion region 602 is positioned at a second edge of the second diffusion wheel 420 (i.e., on the right as shown in FIG. 6), which corresponds to the second edge of the first diffusion wheel 410 (i.e., on the right as shown in FIG. 5). The remaining diffusion regions 604-612 are arranged in an order of progressively-increasing degrees of diffusion or frost. In other words, a first edge of the second diffusion wheel 420 (i.e., on the left as shown in FIG. 6) is associated with the lowest-diffusion region other than the first diffusion region 602 (i.e., the second diffusion region 604), while the highest-diffusion region (i.e., the sixth diffusion region 612) is positioned adjacent to the first diffusion region 602.

As shown in FIG. 6, the second diffusion wheel 420 has an angular dimension of 200°. The first through fifth diffusion regions 602-610 each have angular dimensions of 30°, while the sixth diffusion region 612 has an angular dimension of 50°. As explained above, in some embodiments, the angular dimension of 50° is sufficient to fully cover the light beam passing through the second diffusion wheel 420, while the angular dimension of 30° is insufficient to fully cover the light beam passing through the second diffusion wheel 420.

In other embodiments, the second diffusion wheel 420 may contain more or fewer diffusion regions than shown in FIG. 6. For example, in another embodiment, the second diffusion wheel 420 includes only a single diffusion region (e.g., the first diffusion region 602) that has a degree of diffusion that is approximately equal to the degree of diffusion of the first diffusion region 502 in the first diffusion wheel 410.

In other embodiments, the diffusion regions of the second diffusion wheel 420 may provide different degrees of diffusion than shown in FIG. 6. The angular dimension of the diffusion regions 602-612 of the second diffusion wheel 420 may also differ from those shown in FIG. 6. For example, the diffusion regions 602-612 may all be of the same size (e.g., the same angular dimension), such as all being 30°, all being 50°, or all being a different angle. Further, although depicted as discrete diffusion regions in FIG. 6, in other examples the second diffusion wheel 420 may include one or more progressive diffusion regions that each provide different (e.g., increasing or decreasing, depending on direction of rotation) degrees of diffusion, such as to implement the second through sixth diffusion regions 604-612.

Referring back to FIGS. 2 and 3, the first and second diffusion wheels 410, 420 (or 214, collectively) are shown in a retracted position, in which neither the first and second diffusion wheels 410, 420 is positioned in the beam path. That is, when the first and second diffusion wheels 410, 420 are in the retracted position, the light beam passes through the lens subsystem 208 and the lens subsystem 210 without passing through the first and second diffusion wheels 410, 420. The first and second diffusion wheels 410, 420 being in the retracted position thus corresponds to the luminaire 100 producing an undiffused beam as described above (subject to modification by other components of the luminaire 100, such as the imaging subsystem 206). The diffusion wheel subsystem 400 is in a retracted configuration when the first and second diffusion wheels 410, 420 are in the retracted position.

Figure 7:
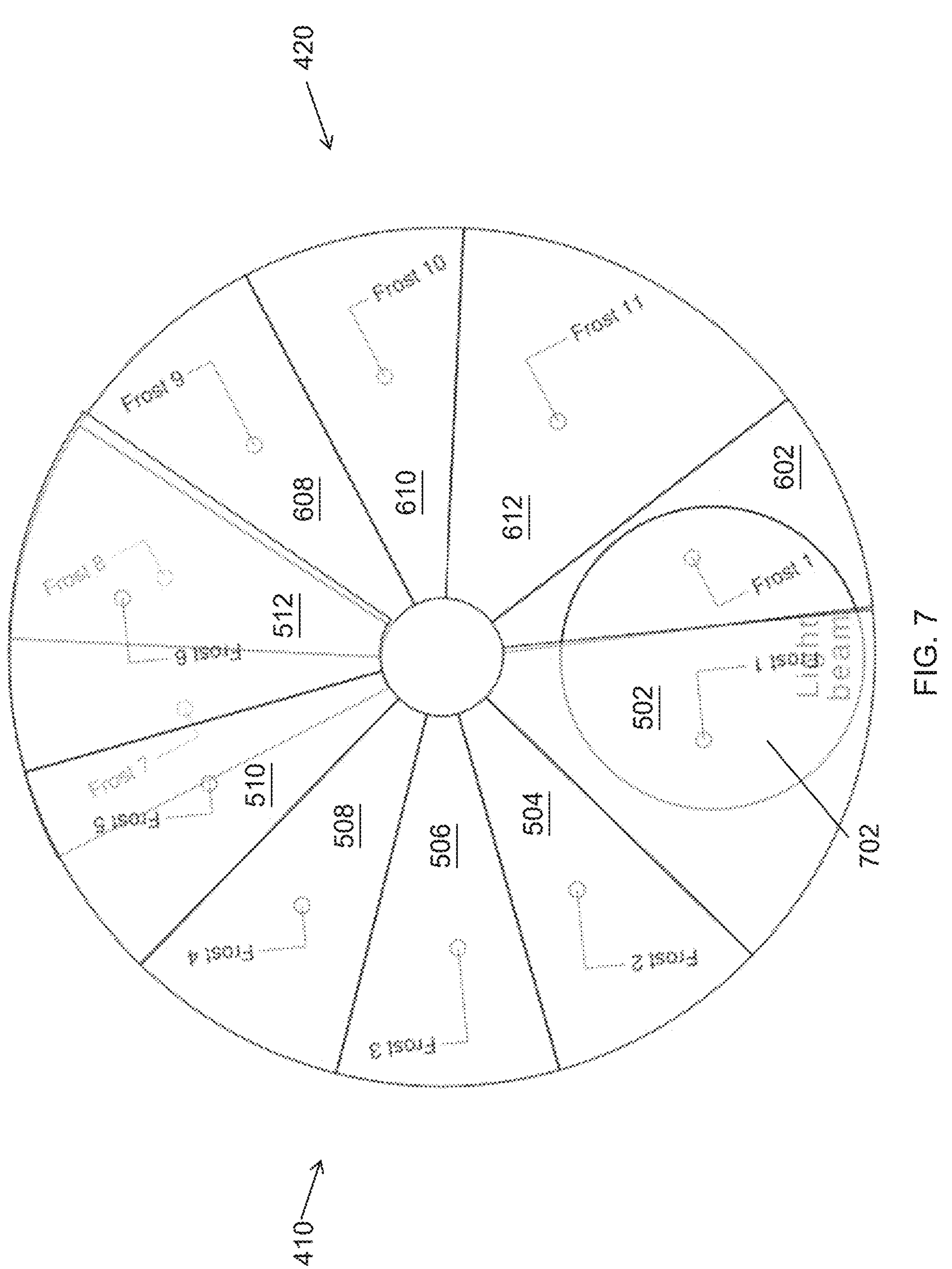
FIG. 7 shows a diagrammatic view of the first and second diffusion wheels in an initial position according to the disclosure.

FIG. 7 shows the first diffusion wheel 410 and the second diffusion wheel 420 in initial diffusing positions (e.g., distinct from the retracted position of FIGS. 2 and 3) in accordance with the embodiments described herein. In the initial position, the first diffusion region 502 of the first diffusion wheel 410 and the first diffusion region 602 of the second diffusion wheel 420 are radially adjacent to each other. In some cases, in the initial position, the first diffusion region 502 and the first diffusion region 602 may not be precisely radially adjacent, and instead may have a relatively small degree of overlap or a gap therebetween. For the sake of brevity, such adjacency refers to being adjacent while taking manufacturing and/or operation tolerances into account. As shown in FIG. 7, in the initial position, the first diffusion region 502 and the first diffusion region 602 cover the light beam 702, and thus the light beam produced by the luminaire 100 is subjected to 0.5° of frost. The diffusion wheel subsystem 400 is in an initial diffusing configuration when the first and second diffusion wheels 410, 420 are in the initial diffusing position.

To transition the diffusion wheel subsystem 400 from the retracted configuration to the initial diffusing configuration, the motors 412, 422 drive the first and second diffusion wheels 410, 420, respectively, to rotate in opposite directions. For example, in the configurations depicted in FIGS. 5 and 6, the first diffusion wheel 410 rotates counter-clockwise and the second diffusion wheel 420 rotates clockwise. As a result, the first diffusion region 502 and the first diffusion region 602 are each inserted into the path of the light beam 702 from a different (e.g., opposing) side. The control of the first and second diffusion wheels 410, 420 may be such that the first diffusion region 502 and the first diffusion region 602 enter into the path of the light beam 702 at approximately the same time, taking manufacturing tolerances into account. As explained above, this may alleviate or reduce perceivable visual artifacts that occur when a frost flag is inserted from only one side of the light beam 702. In other words, the first diffusion region 502 and the first diffusion region 602 enter into the path of the light beam 702 at least close enough in time so as to reduce perceivable visual artifacts relative to inserting a frost flag from only one side of the light beam 702.

Figure 8:
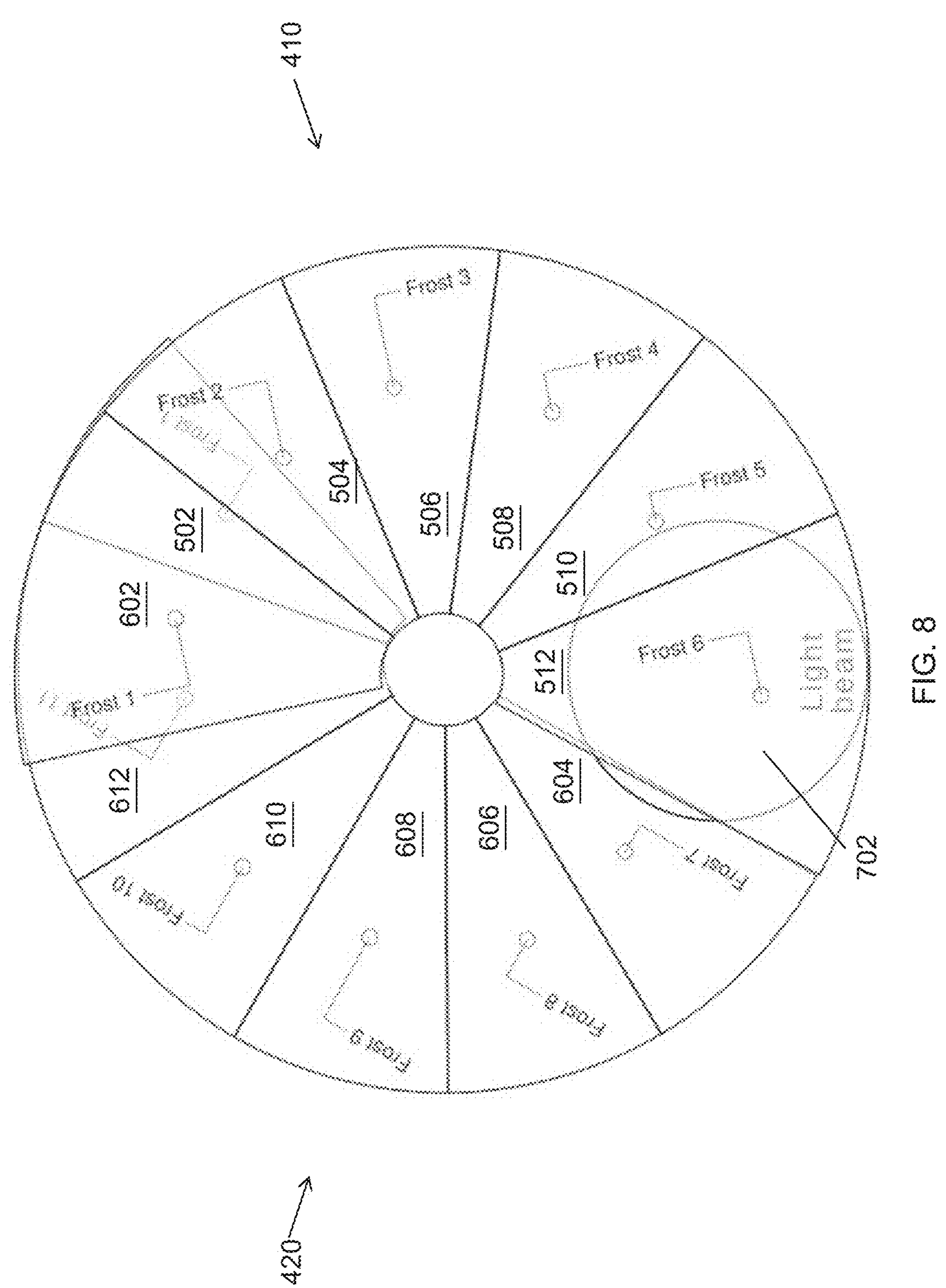
FIG. 8 shows a diagrammatic view of the first and second diffusion wheels in a rotated position following being in the initial position according to the disclosure.

FIG. 8 shows the first diffusion wheel 410 and the second diffusion wheel 420 in a rotated position relative to and following being in the initial position, in accordance with the embodiments described herein. In the rotated position specifically shown in FIG. 8, the sixth diffusion region 512 of the first diffusion wheel 410 is predominantly covering the light beam 702, and thus most of the light beam produced by the luminaire 100 is subjected to 5° of frost. The diffusion wheel subsystem 400 is in a rotated configuration when the first and second diffusion wheels 410, 420 are in the rotated position.

To transition the diffusion wheel subsystem 400 from the initial diffusing configuration to the rotated configuration, the motors 412, 422 drive the first and second diffusion wheels 410, 420, respectively, to rotate in the same direction. For example, in the configurations depicted in FIGS. 5 and 6, the first and second diffusion wheels 410, 420 are rotated counter-clockwise to move the diffusion regions of the first diffusion wheel 410 (and, subsequently, the second diffusion wheel 420) through the light beam 702 in a progressively-increasing manner. For example, during the process of rotating from the initial position to the rotated position shown in FIG. 8, the second diffusion region 504 is placed in the beam path, followed by the third diffusion region 506, the fourth diffusion region 508, and the fifth diffusion region 510 before arriving at the rotated position shown in FIG. 8. As explained above, it may be more visually pleasing for a viewer to observe progressively-increasing diffusion levels from the hard-edge beam to 5° frost (as provided by the sixth diffusion region 512 as depicted in FIG. 8), rather than observing a jump from the hard-edge beam to 5° directly, which would result from inserting a 5° frost flag into the beam path.

It should be appreciated that although the first and second diffusion wheels 410, 420 rotate in the same direction to transition from the initial position to the rotated position, the first and second diffusion wheels 410, 420 may not necessarily rotate at the same angular speed, depending on the overlap of various diffusion regions of the first and second diffusion wheels 410, 420. For example, one of the first and second diffusion wheels 410, 420 may be driven to rotate faster than the other in order to avoid overlap of the first and second diffusion wheels 410, 420 in the beam path. That is, the first and second diffusion wheels 410, 420 rotate at different angular speeds to avoid overlap of diffusion regions of the first and second diffusion wheels 410, 420 in the beam path.

Figure 9:
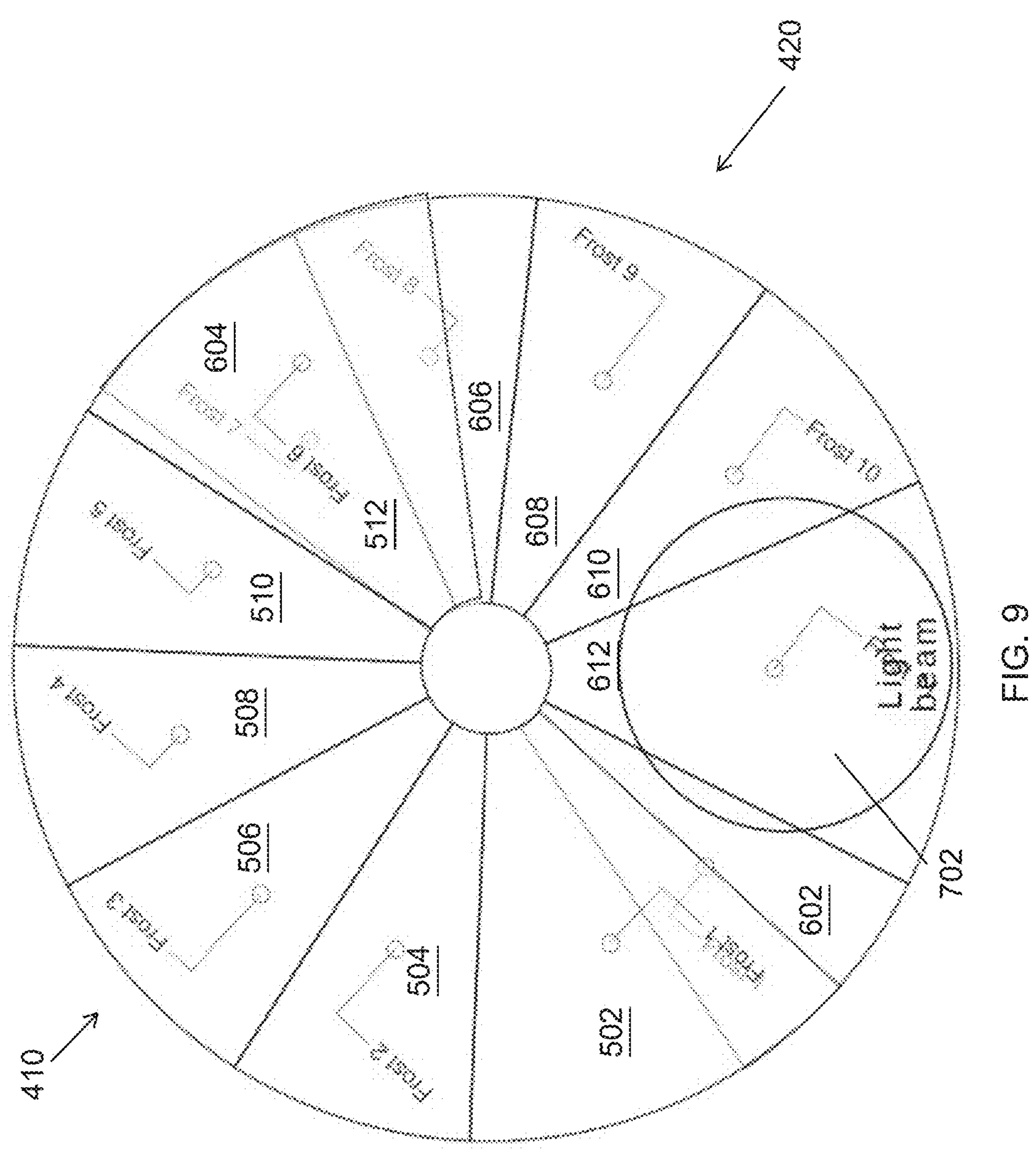
FIG. 9 shows a diagrammatic view of the first and second diffusion wheels in another rotated position following being in the position of FIG. 8 according to the disclosure.

FIG. 9 shows the first diffusion wheel 410 and the second diffusion wheel 420 in a further rotated position relative to and following being in the rotated position of FIG. 8, in accordance with the embodiments described herein. In the rotated position specifically shown in FIG. 9, the sixth diffusion region 612 of the second diffusion wheel 420 is predominantly covering the light beam 702, and thus most of the light beam produced by the luminaire 100 is subjected to 10° of frost.

To transition from the rotated position of FIG. 8 to the rotated position of FIG. 9, the motors 412, 422 continue to drive the first and second diffusion wheels 410, 420, respectively, to rotate in the same direction. For example, in the configurations depicted in FIGS. 5 and 6, the first and second diffusion wheels 410, 420 are rotated counter-clockwise to move the sixth diffusion region 512 of the first diffusion wheel 410 out of the light beam, and the sixth diffusion region 612 of the second diffusion wheel 420 into the light beam 702. Subsequently, during the process of rotating from the rotated position shown in FIG. 8 to the rotated position shown in FIG. 9, the third diffusion region 606 is placed in the beam path, followed by the fourth diffusion region 608, and the fifth diffusion region 610 before arriving at the rotated position shown in FIG. 9. As explained above, it may be more visually pleasing for a viewer to observe progressively-increasing diffusion levels from the hard-edge beam to 10° frost (as provided by the sixth diffusion region 612 as depicted in FIG. 9), rather than observing a jump from the hard-edge beam to 10° directly, which would result from inserting a 10° frost flag into the beam path.

Transitioning from any of the rotated positions back to the retracted position may be accomplished by reversing the above-described movement of the first and second diffusion wheels 410, 420. In other words, progressively-decreasing diffusion levels may be applied to the light beam 702 until the first diffusion region 502 and the first diffusion region 602 cover the light beam 702, providing the lowest level of frost in the initial position, or 0.5° in the examples described herein. Subsequently, the first and second diffusion wheels 410, 420 are again rotated in opposite directions out of the path of the light beam 702 and into the retracted position.

In another example, following the rotated position shown in FIG. 9, the second diffusion wheel 420 continues to rotate, which places the first diffusion region 602 (having a 0.5° degree of diffusion) in the path of the light beam 702. The first diffusion wheel 410 may not rotate during this time, because it is already out of the path of the light beam 702 in FIG. 9. Finally, the first diffusion region 602 rotates out of the path of the light beam 702, and thus the first and second diffusion wheels 410, 420 are again in the retracted position, in which the luminaire 100 produces a hard-edge beam as described above (subject to modification by other components of the luminaire 100, such as the imaging subsystem 206).

In another embodiment, the diffusion wheel subsystem 400 includes one or more additional diffusion wheels, along with motor(s) and/or gear system(s) to drive the additional diffusion wheel(s). In this embodiment, the additional diffusion wheel(s) are in a stacked arrangement with the first and second diffusion wheels 410, 420, and serve to extend a range of degrees of diffusion available for the luminaire 100. For example, a third diffusion wheel includes five diffusion regions having 11°, 12°, 13°, 14°, and 15° degrees of diffusion, respectively. In this example, the first and second diffusion wheels 410, 420 may be controlled as generally described above, while the third diffusion wheel is configured to follow the second diffusion wheel 420 into the light beam to provide up to a 15° degree of diffusion for the luminaire.

In yet another embodiment, to transition the diffusion wheel subsystem 400 from the initial diffusing configuration to the rotated configuration, the motors 412, 422 continue to drive the first and second diffusion wheels 410, 420, respectively, to rotate in opposite directions. In this embodiment, the arrangement of diffusion regions in the first and second diffusion wheels 410, 420 may be different than that shown in FIGS. 5 and 6. For example, each of the first and second diffusion wheels 410, 420 may include a progressive diffusion region that provides a progressive range of diffusion to the light beam passing therethrough. However, the progressive diffusion regions of the first and second diffusion wheels 410, 420 are arranged in a mirror-image fashion. That is, a portion of the progressive diffusion region of the first diffusion wheel 410 that provides a lowest degree of diffusion is arranged at the first edge of the first diffusion wheel 410, while a portion of the progressive diffusion region of the second diffusion wheel 420 that provides a lowest degree of diffusion is arranged at the second edge of the second diffusion wheel 420.

As a result, the portions of the progressive diffusion regions of the first and second diffusion wheels 410, 420 that provide the lowest degree of diffusion are inserted into the emitted light beam from a different (e.g., opposing) side when the first and second diffusion wheels 410, 420 are rotated in opposite directions to each other. Subsequently, as the first and second diffusion wheels 410, 420 continue to rotate in opposite directions to each other, the degree of diffusion provided to the emitted light beam increases as a function of the increasing degrees of diffusion provided by the progressive diffusion regions of both the first and second diffusion wheels 410, 420.

Figure 10:
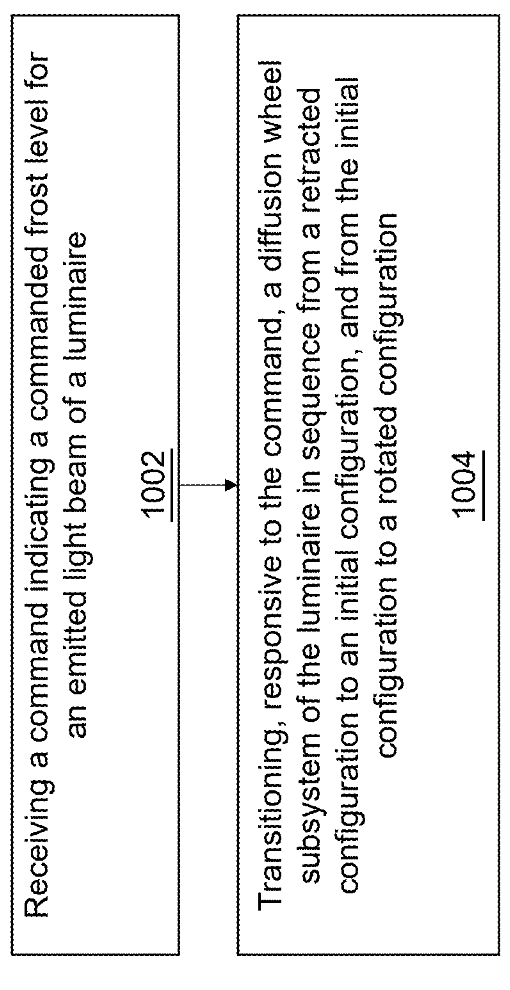
FIG. 10 presents a flow chart of a method of controlling a luminaire according to the disclosure.

FIG. 10 shows a flow chart of a method 1000 of controlling a luminaire 100 according to the disclosure. The method 1000 may be implemented by a luminaire control system that includes the diffusion wheel subsystem 400 and the control system 110 described above. The method 1000 begins in block 1002 with receiving a command indicating a commanded frost level for an emitted light beam of the luminaire 100. For example, the control system 110 receives a DMX channel value via the data link, where the DMX channel value corresponds to a target diffusion level (e.g., the commanded frost level).

Responsive to receiving the command indicating the commanded frost level, the method 1000 continues in block 1004 with transitioning a diffusion wheel subsystem 400 of the luminaire 100 in sequence from a retracted configuration to an initial configuration, and then from the initial configuration to a rotated configuration.

The diffusion wheel subsystem 400 is in a retracted configuration when the first and second diffusion wheels 410, 420 are in the retracted position. The first and second diffusion wheels 410, 420 are shown in the retracted position in FIGS. 2 and 3, in which neither the first and second diffusion wheels 410, 420 is positioned in the beam path.

The diffusion wheel subsystem 400 is in an initial configuration when the first and second diffusion wheels 410, 420 are in the initial position. The first and second diffusion wheels 410, 420 are shown in the initial position in FIG. 7. In the initial position, the first diffusion region 502 of the first diffusion wheel 410 and the first diffusion region 602 of the second diffusion wheel 420 are radially adjacent to each other and one or both of the first diffusion regions 502, 602 is in the emitted light beam. Transitioning the diffusion wheel subsystem 400 from the retracted configuration to the initial configuration may be achieved by driving the first and second diffusion wheels 410, 420, respectively, to rotate in opposite directions. As a result, the first diffusion region 502 and the first diffusion region 602 are each inserted into the emitted light beam from a different (e.g., opposing) side. The control of the first and second diffusion wheels 410, 420 may be such that the first diffusion region 502 and the first diffusion region 602 enter into the path of the emitted light beam at approximately the same time, taking manufacturing tolerances into account.

The diffusion wheel subsystem 400 is in a rotated configuration when the first and second diffusion wheels 410, 420 are in the rotated position. The first and second diffusion wheels 410, 420 are shown in rotated positions in FIGS. 8 and 9. In the rotated position, one of the diffusion regions other than the first diffusion regions 502, 602 is in the emitted light beam, which subjects the emitted light beam to a degree of frost or diffusion that is greater than that of the first diffusion regions 502, 602. The particular diffusion region in the emitted light beam in the rotated configuration is controlled based on the commanded frost level. Transitioning the diffusion wheel subsystem 400 from the initial configuration to the rotated configuration may be achieved by driving the first and second diffusion wheels 410, 420 to rotate in the same direction. In other words, one of the first and second diffusion wheels 410, 420 reverses direction moving into the initial position and then moving to the rotated position.

While only some embodiments of the disclosure have been described herein, those skilled in the art, having benefit of this disclosure, will appreciate that other embodiments may be devised which do not depart from the scope of the disclosure herein. While the disclosure has been described in detail, it should be understood that various changes, substitutions, and alterations can be made hereto without departing from the spirit and scope of the disclosure.

What is claimed is:

1. A luminaire, comprising:

a light source configured to generate an emitted light beam; and a diffusion wheel subsystem, comprising:

a first diffusion wheel configured to provide different degrees of diffusion to a light beam passing therethrough, wherein a first diffusion region of the first diffusion wheel provides a lowest degree of diffusion, and wherein the first diffusion region of the first diffusion wheel is located at a first edge of the first diffusion wheel; and a second diffusion wheel stacked with the first diffusion wheel and configured to provide different degrees of diffusion to a light beam passing therethrough, wherein a first diffusion region of the second diffusion wheel provides a degree of diffusion approximately equal to that of the first diffusion region of the first diffusion wheel, wherein the first diffusion region of the second diffusion wheel is located at a second edge of the second diffusion wheel, and wherein the second edge of the second diffusion wheel is an opposite edge relative to the first edge of the first diffusion wheel, wherein the diffusion wheel subsystem is configured to be in a retracted configuration in which the first and second diffusion wheels are positioned out of the emitted light beam, wherein the diffusion wheel subsystem is configured to be in an initial configuration in which the first diffusion region of the first diffusion wheel is radially adjacent in the emitted light beam to the first diffusion region of the second diffusion wheel, and in which at least one of the first diffusion regions of the first and second diffusion wheels is positioned in the emitted light beam, wherein the first diffusion wheel and the second diffusion wheel are configured to rotate in opposite directions to transition from the retracted configuration to the initial configuration, wherein the diffusion wheel subsystem is configured to be in a rotated configuration relative to the initial configuration in which one or more of the diffusion regions of the first diffusion wheel or of the second diffusion wheel are in the emitted light beam, and wherein the first diffusion wheel and the second diffusion wheel are configured to rotate in a same direction to transition from the initial configuration to the rotated configuration.

2. The luminaire of claim 1, wherein the diffusion wheel subsystem is configured such that, during the transition from the retracted configuration to the initial configuration, the first edge of the first diffusion wheel and the second edge of the second diffusion wheel enter the emitted light beam from opposing sides at a same time.

3. The luminaire of claim 1, wherein the diffusion wheel subsystem is configured such that the first and second diffusion wheels rotate at different angular speeds during the transition from the initial configuration to the rotated configuration.

4. The luminaire of claim 1, wherein the first diffusion wheel comprises a first plurality of diffusion regions including the first diffusion region of the first diffusion wheel, each of the first plurality of diffusion regions configured to provide a different degree of diffusion to the light beam passing therethrough, and wherein the second diffusion wheel comprises a second plurality of diffusion regions including the first diffusion region of the second diffusion wheel, each of the second plurality of diffusion regions configured to provide a different degree of diffusion to the light beam passing therethrough.

5. The luminaire of claim 4, wherein the first plurality of diffusion regions includes second through $m^{th}$ diffusion regions, wherein the second plurality of diffusion regions includes second through $n^{th}$ diffusion regions, wherein the $m^{th}$ diffusion region of the first plurality of diffusion regions is located at a second edge of the first diffusion wheel, and wherein the second diffusion region of the second plurality of diffusion regions is located at a first edge of the second diffusion wheel.

6. The luminaire of claim 5, wherein a degree of diffusion of the second through $m^{th}$ diffusion regions of the first plurality of diffusion regions progressively increases.

7. The luminaire of claim 6, wherein a degree of diffusion of the second through $n^{th}$ diffusion regions of the second plurality of diffusion regions progressively increases.

8. The luminaire of claim 7, wherein the degree of diffusion of the second diffusion region of the second plurality of diffusion regions is greater than the degree of diffusion of the $m^{th}$ diffusion region of the first plurality of diffusion regions.

9. The luminaire of claim 4, wherein at least one of the diffusion regions of the first diffusion wheel has an angular dimension sufficient to fully cover the emitted light beam when passing therethrough.

10. The luminaire of claim 4, wherein at least one of the diffusion regions of the first diffusion wheel has an angular dimension that is not sufficient to fully cover the emitted light beam when passing therethrough.

11. The luminaire of claim 1, wherein the first diffusion wheel comprises at least one progressive diffusion region that provides a progressive range of diffusion to the light beam passing therethrough, and wherein the second diffusion wheel comprises at least one progressive diffusion region that provides a progressive range of diffusion to the light beam passing therethrough.

12. A method of controlling a luminaire, comprising:

receiving, by a control system of the luminaire via a data link, a command indicating a commanded frost level for an emitted light beam of the luminaire; and transitioning, responsive to the command, a diffusion wheel subsystem of the luminaire in sequence from a retracted configuration to an initial configuration, and from the initial configuration to a rotated configuration, wherein the diffusion wheel subsystem comprises:

a first diffusion wheel configured to provide different degrees of diffusion to a light beam passing therethrough, wherein a first diffusion region of the first diffusion wheel provides a lowest degree of diffusion; and a second diffusion wheel configured to provide different degrees of diffusion to a light beam passing therethrough, wherein a first diffusion region of the second diffusion wheel provides a degree of diffusion approximately equal to that of the first diffusion region of the first diffusion wheel, wherein in the retracted configuration, the first and second diffusion wheels are positioned out of the emitted light beam, wherein transitioning the diffusion wheel subsystem from the retracted configuration to the initial configuration comprises rotating the first diffusion wheel and the second diffusion wheel in opposite directions until the first diffusion region of the first diffusion wheel is radially adjacent in the emitted light beam to the first diffusion region of the second diffusion wheel, and wherein transitioning the diffusion wheel subsystem from the initial configuration to the rotated configuration comprises rotating the first diffusion wheel and the second diffusion wheel in a same direction until a diffusion region corresponding to the commanded frost level is in the emitted light beam.

13. The method of claim 12, wherein during the transition from the retracted configuration to the initial configuration, a first edge of the first diffusion wheel and a second edge of the second diffusion wheel enter the emitted light beam from opposing sides at a same time.

14. The method of claim 12, wherein the first and second diffusion wheels rotate at different angular speeds during the transition from the initial configuration to the rotated configuration.

15. The method of claim 12, wherein rotating the first and second diffusion wheels in the same direction applies progressively-increasing degrees of diffusion to the emitted light beam.

16. The method of claim 12, wherein the first diffusion wheel comprises a first plurality of diffusion regions including the first diffusion region of the first diffusion wheel, each of the first plurality of diffusion regions configured to provide a different degree of diffusion to the light beam passing therethrough, and wherein the second diffusion wheel comprises a second plurality of diffusion regions including the first diffusion region of the second diffusion wheel, each of the second plurality of diffusion regions configured to provide a different degree of diffusion to the light beam passing therethrough.

17. The method of claim 12, wherein the first diffusion wheel comprises at least one progressive diffusion region that provides a progressive range of diffusion to the light beam passing therethrough, and wherein the second diffusion wheel comprises at least one progressive diffusion region that provides a progressive range of diffusion to the light beam passing therethrough.

* * * * *